(12) United States Patent
Nowack et al.

(10) Patent No.: US 9,512,948 B2
(45) Date of Patent: Dec. 6, 2016

(54) COAXIAL HIGH-PRESSURE COUPLING WITH OVERPRESSURE RELIEF

(71) Applicant: PARKER HANNIFIN MANUFACTURING GERMANY GMBH & CO. KG, Bielefeld (DE)

(72) Inventors: Olaf Nowack, Iggingen (DE); Stefan Witt, Ederdingen-Nussdorf (DE)

(73) Assignee: Parker Hannifin Manufacturing Germany GmbH & Co. KG, Bielefeld (DE)

( * ) Notice: Subject to any disclaimer, the term of this patent is extended or adjusted under 35 U.S.C. 154(b) by 0 days.

(21) Appl. No.: 14/436,245

(22) PCT Filed: Oct. 15, 2013

(86) PCT No.: PCT/EP2013/071552
§ 371 (c)(1),
(2) Date: Apr. 16, 2015

(87) PCT Pub. No.: WO2014/060433
PCT Pub. Date: Apr. 24, 2014

(65) Prior Publication Data
US 2015/0267850 A1    Sep. 24, 2015

(30) Foreign Application Priority Data

Oct. 16, 2012  (DE) .................... 10 2012 109 865
Mar. 11, 2013  (DE) .................... 10 2013 102 383

(51) Int. Cl.
*F16L 37/32*   (2006.01)
*F16L 37/56*   (2006.01)
*F16L 37/34*   (2006.01)

(52) U.S. Cl.
CPC ............... *F16L 37/32* (2013.01); *F16L 37/34* (2013.01); *F16L 37/56* (2013.01); *F16L 37/565* (2013.01); *Y10T 137/87957* (2015.04)

(58) Field of Classification Search
CPC ............. F16L 37/30; F16L 37/32; F16L 37/34; F16L 37/56; F16L 37/565
(Continued)

(56) References Cited

U.S. PATENT DOCUMENTS 5,014,743 A * 5/1991 Makishima ............. F16L 37/23
                                                   137/614.03
5,465,754 A   11/1995 Sudo et al.
(Continued)

FOREIGN PATENT DOCUMENTS

DE   44 41 428    11/1995
DE   101 07 907    5/2002
(Continued)

OTHER PUBLICATIONS

International Search Report for corresponding Patent Application No. PCT/EP2013/071552 dated Mar. 3, 2014.

*Primary Examiner* — Kevin Lee
(74) *Attorney, Agent, or Firm* — Renner, Otto, Boisselle & Sklar LLP

(57) ABSTRACT

The invention relates to a coaxial high-pressure coupling for hoses or pipelines, comprising a plug part (10) and a receptacle part (30) that accommodates the plug part in the coupled state, the plug part (10) and the receptacle part (30) each having a valve body (11, 31) having an inner channel (13, 33) and an outer channel (16, 36) concentric to the inner channel and the inner channels (13, 33) and the outer channels (16, 36) of the plug part (10) and of the receptacle part (30) being connected to each other in the coupled state, and in the inner channel (13) of the valve body (11) of the plug part (10) a closing cone (18) and in the outer channel (16) of the plug part (10) a closing sleeve (23) each being movable against spring action (21, 25) and being displaceable into the opening position thereof by the receptacle part (30) during the coupling process, is characterized in that a valve bore (61), which is connected to the inner channel (13) at one end and has a connection to the atmosphere at the
(Continued)

other end and has a valve piston (62) movably arranged in the valve bore, is arranged inside the inner channel (13) formed by an inner pipe (14) and that the valve piston (62) is preloaded by spring action (63) into the blocking position of the valve piston, in which the connection between the valve bore (61) and the inner channel (13) is blocked, and can be displaced into a leakage position by an overpressure in the inner channel (13) that acts against the spring (63).

12 Claims, 5 Drawing Sheets

(58) Field of Classification Search
USPC .......................................... 137/614.03–614.05
See application file for complete search history.

(56) References Cited

U.S. PATENT DOCUMENTS

| 6,354,564 B1 * | 3/2002 | Van Scyoc et al. .... | F16L 37/32 |
| | | | 137/614.04 |
| 8,387,949 B2 * | 3/2013 | Ekstrom et al. ......... | 137/614.03 |
| 8,707,993 B2 * | 4/2014 | Cardi et al. ............. | F16L 37/56 |
| | | | 137/595 |

FOREIGN PATENT DOCUMENTS

| EP | 0 853 743 | 12/1999 |
| GB | 2 184 508 | 6/1987 |
| WO | 2008/130311 | 10/2008 |

* cited by examiner

COAXIAL HIGH-PRESSURE COUPLING WITH OVERPRESSURE RELIEF

The invention relates to a coaxial high-pressure coupling for hoses or pipelines with a plug part and with a receptacle part that accommodates the plug part in the coupled state, wherein the plug part and the receptacle part each having a valve body with an inner channel and an outer channel arranged concentric thereto, wherein the inner channels and the outer channels of the plug part and of the receptacle part are connected to one another in the coupled state, wherein a closing cone can be moved against the force of a spring in the inner channel of the valve body of the plug part and a closing sleeve can be moved against the force of a spring in the outer channel of the plug part, and wherein the closing cone and the closing sleeve can be respectively displaced into their open position by the receptacle part during the coupling process.

BACKGROUND OF THE INVENTION

A high-pressure coupling with the aforementioned features is described in EP 0 853 743 B1. Couplings of this type with a plug part having an inner and an outer channel and with a correspondingly designed receptacle part are required, in particular, for connecting a hydraulic drive element to a hydraulically driven device, for example when a drive element in the form of a hydraulic pump is not only connected to a device in the form of a tool by means of a pressure line, but also by means of a return line. In such a high-pressure coupling, it is problematic that the fluid enclosed in the inner channel of the plug part by the closing cone may heat up in the decoupled state and therefore lead to such a pressure increase that it becomes difficult to couple the high-pressure coupling by inserting the plug part into the receptacle part because the closing cone in the inner channel of the plug part needs to be moved against the increased pressure.

SUMMARY OF THE INVENTION

In a correspondingly designed high-pressure coupling known from WO 2008/130311 A, it is proposed to solve the above-described problem by arranging a pressure relief valve in the closing cone that closes the inner channel of the plug part in the decoupled state, wherein said pressure relief valve is opened by a component of the receptacle part at the beginning of the coupling process such that the pressurized fluid in the inner channel of the plug part can flow off into the inner channel of the receptacle part, namely before the respective flow paths between the inner channels and the outer channels of the receptacle part and the plug part are released due to the respective position of the closing elements of the plug part and the receptacle part in the coupled state. However, this known solution has the disadvantage that a very high pressure may in the meantime be present in the plug part and that this high pressure may lead to a permanent high strain on the valve body with its seals and complicate the coupling process despite the pressure relief valve.

The invention therefore is based on the objective of realizing a coaxial high-pressure coupling of the initially cited type and with the above-described features in such a way that the disadvantageous consequences of a pressure increase in the plug part are prevented.

The solution to this objective as well as advantages embodiments and enhancements of the invention are defined in the claims that follow this description.

According to the basic idea of the invention, it is proposed that a valve bore, which is connected to the inner channel at one end and connected to the atmosphere at the other end and has a valve piston displaceably arranged therein, is arranged in the interior of the closing cone that can be moved in the inner channel formed by an inner pipe, and that the valve piston is prestressed into its blocking position, in which it blocks the connection between the valve bore and the inner channel, by the force of a spring and can be displaced into a leakage position by an overpressure in the inner channel that acts against the spring.

The invention provides the advantage that high pressure developing in the inner channel of the valve body of the plug part can be discharged into the atmosphere via the auxiliary valve, which is arranged in the interior of the closing cone and has the spring-loaded valve piston arranged in the valve bore of the closing cone, in that the fluid present in the inner channel acts upon the valve piston when the pressure increases and displaces this valve piston into a leakage position, in which the fluid can flow past the valve piston and escape into the atmosphere. Due to these features, high pressure can no longer develop in the plug part; in fact, this pressure is automatically reduced, namely when the limiting pressure defined by the force of the spring used for prestressing the valve piston is respectively reached. This means that the valve body of the plug part is not subjected to any undesirable pressure effects whatsoever and that the inventive coupling can also be easily coupled.

According to an embodiment of the invention, it is proposed that the valve bore is provided with an incremental cross-sectional widening in order to realize an effective leakage path between the inner channel and the atmosphere in the leakage position of the valve piston.

According to an embodiment of the invention, it is proposed that the cross-sectional widening is spaced apart from the valve piston situated in its blocking position by a clearance that needs to be traveled by the valve piston when it is acted upon with an overpressure, wherein this provides the additional advantage that the fluid initially can expand into the aforementioned clearance as the pressure in the plug part begins to increase without immediately causing the intended leakage and discharge of fluid from the plug part by displacing the valve piston.

According to an embodiment of the invention, it is proposed to insert a check valve between the closing cone arranged in the inner channel of the valve body of the plug part and a continuing line attached to the plug part. This limits the volume enclosed in the plug part or in its valve body after the high-pressure coupling has been decoupled because the fluid volume still present in the hose or pipeline attached to the plug part or a corresponding connector is respectively isolated from the valve body or the connector of the plug part by the check valve such that only the residual fluid present in the valve body or the connector can cause a pressure increase due to external influences.

Since a pressure increase in the outer channel of the plug part also cannot be entirely precluded in the decoupled state of the high-pressure coupling, an embodiment of the invention proposes to provide a hollow space, which is connected to the outer channel or to the connecting bore assigned thereto, in the plug part in order to prevent a pressure increase in its outer channel in the valve body or in the receptacle part, wherein a piston is movably arranged in said hollow space and prestressed into a position, in which it blocks the hollow space, by means of a spring, and wherein said piston can be displaced into the hollow space into a position, in which it unblocks the hollow space so as to realize a pressure compensation, due to an increasing pressure in the outer channel or in the connecting bore. In case a pressure increase occurs in the outer channel of the plug part, the motion of the piston in the hollow space provides an additional volume in the form of the unblocked portion of the hollow space, into which the fluid volume present in the outer channel can expand, such that an increasing pressure can be accordingly reduced.

In a coupling of the initially cited type, it shall furthermore be ensured that all four pipelines or hoses attached to the coupling parts are not simultaneously connected to one another when the coupling is coupled. In a correspondingly designed high-pressure coupling known from EP 1 789 717 B1, it is proposed to incorporate a bypass valve at least into the valve body structure of the receptacle part for this purpose, wherein said bypass valve on the one hand produces a connection between the inner channel and the outer channel of the receptacle part in the decoupled state in order to realize a pressure compensation and on the other hand closes this connection in the coupled state.

According to a practical embodiment of the invention, it is therefore proposed that an inner pipe forming the inner channel of the receptacle part has two bores that are arranged at an axial clearance from one another, and that a sleeve-shaped closing body, which can be displaced on the inner pipe in the outer channel surrounding the inner pipe, on the one hand closes the front bore of the inner pipe that faces the plug part and opens the rear bore as a bypass between the inner channel and the outer channel of the receptacle part in a closing position, in which the sleeve-shaped closing body is situated in the decoupled state, and on the other hand closes the rear bore of the inner pipe and opens the front bore in a position, in which the sleeve-shaped closing body is displaced into the interior of the valve body of the receptacle part due to the contact between the end face of the inner pipe of the plug part facing the receptacle part and the end face of the closing body of the receptacle part during the coupling process, such that the inner channel of the receptacle part is connected to the inner channel of the plug part via the front bore in the coupled state.

Since the closing body in the receptacle part is displaced into an open position for the front bore of the inner pipe of the receptacle part by the inner pipe of the plug part, the end face of which presses against the end face of the closing body during the coupling process when the plug part is inserted into the receptacle part, a potential flow path is formed between the contacting end faces of the inner pipe of the plug part and the closing body of the receptacle part such that the fluid can overflow from the inner channel of the receptacle part into the outer channel of the plug part via this flow path when a corresponding pressure difference exists between the inner channel of the receptacle part and the outer channel of the plug part. Since the coupling process cannot take place against an overpressure in the inner channel of the plug part due to the inventive design of the plug part with its overpressure relief, such a bypass connection between the inner channel of the receptacle part and the outer channel of the plug part is not provided during the coupling process and the end faces of the closing body and the inner pipe are sealed relative to one another in accordance with an embodiment of the invention in order to continuously seal the inner channel of the receptacle part relative to the outer channel of the plug part.

In alternative embodiments of the invention, it is proposed that the end faces are either sealed relative to one another by arranging a groove with a seal inserted therein in one of the two end faces or that the end faces are sealed relative to one another by processing at least one of the end faces such that a metallic seal is realized when the end faces contact one another.

According to an embodiment of the invention, however, it is also not excluded that such a bypass between the inner channel of the receptacle part and the outer channel of the plug part becomes effective in a certain stage of the coupling process, wherein it would be conceivable that the contacting end faces of the closing body of the receptacle part and of the inner pipe of the plug part allow a fluid passage of the type generally known from EP 1 789 717 B1 and the inner channel of the receptacle part is briefly connected to the outer channel of the plug part in an intermediate stage during the coupling process.

In this context, it is specifically proposed that a sliding ring of a material with sound sliding properties, which is respectively positioned on the outer ends of the sleeve-shaped closing body, as well as a spacer ring lying in between, are arranged in the interior of the sleeve-shaped closing body that can be displaced on the inner pipe, wherein the spacer ring covers the front bore of the inner pipe in the closed position of the closing body in the decoupled state and the two sliding rings are sealed relative to the closing body by means of ring seals arranged on their circumference.

In order to actuate the high-pressure coupling during the coupling and decoupling processes, aforementioned publication WO 2008/130311 A proposes that a rotatable outer actuating sleeve and an inner locking sleeve, which cooperates with the outer actuating sleeve and has driving projections that engage into screw-shaped grooves of the plug part, are arranged on the receptacle part. When the plug part is at the beginning of the coupling process inserted into the receptacle part to such an extent that the driving projections on the inner side of the locking sleeve engage into the screw-shaped grooves of the plug part, the coupling process can be carried out by rotating the actuating sleeve, whereby the driving projections sliding in the screw-shaped grooves of the plug part force the plug part to carry out an axial motion into the receptacle part until the receptacle part and the plug part are completely coupled.

Since a thusly designed high-pressure coupling can also be inadvertently decoupled due to a backward rotation of the actuating sleeve, the invention proposes to additionally secure the high-pressure coupling against unintentional decoupling in that the outer actuating sleeve can be displaced relative to the locking sleeve between a decoupled idle position, in which it is freely rotatable relative to the locking sleeve, and an engaged position with the locking sleeve, wherein the actuating sleeve is interlocked with the locking sleeve with the aid of an interlock means in the engaged position such that the locking sleeve is only rotationally driven due to a rotation of the actuating sleeve in the engaged position. Consequently, the high-pressure coupling can only be coupled and decoupled if the outer actuating sleeve initially is axially displaced into the engaged position with the locking sleeve, in which a rotation of the actuating sleeve is converted into a rotation of the locking sleeve. After the actuating sleeve has been released, it returns into its idle position, in which a rotation of the locking sleeve and therefore the coupling motion are precluded, under the influence of a correspondingly arranged spring.

BRIEF DESCRIPTION OF THE DRAWINGS

Embodiments of the invention are illustrated in the drawings and described in greater detail below. In these drawings.

DETAILED DESCRIPTION

Figure 1:
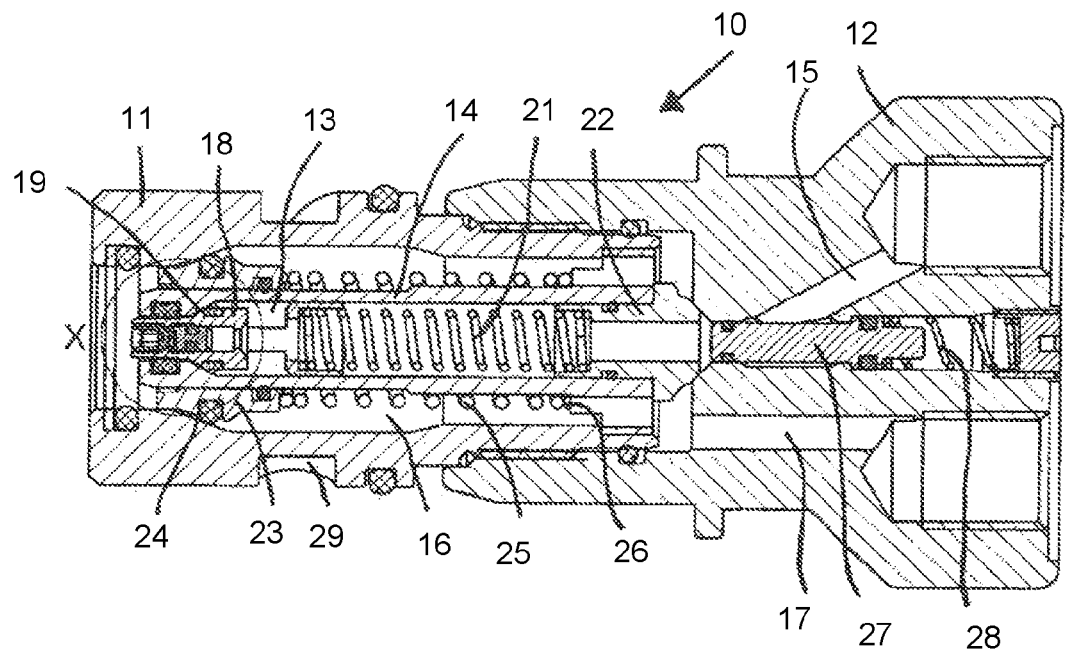
FIG. 1 shows an individual illustration of the plug part of a high-pressure coupling in the form of a sectioned side view.

The plug part 10 of a high-pressure coupling illustrated in FIG. 1 has a valve body 11 and a connector 12 connected thereto. An inner channel 13 formed by an inner pipe 14 of the valve body 10 is provided in the valve body 11 and can be connected to a not-shown hose or pipeline attached to the connector 12 via a connecting bore 15 in the connector 12. An outer channel 16, which concentrically surrounds the inner channel 13, is furthermore provided in the valve body 11 and connected to a connecting bore 17 in the connector 12 such that it is also connected to the hose or pipeline attached to the connector 12 by means of said connecting bore.

In the closed position of the plug part 10 shown, a closing cone 18 arranged in the inner pipe 14 is pressed against a conical seat 19 by a spring 21 that is supported on a spring abutment 22; in this case, the closing cone 18 is sealed relative to the inner wall of the inner pipe 14 by means of a seal 20.

In order to close the outer channel 16, a closing sleeve 23 is displaceably guided on the inner pipe 14 and pressed against a sealing seat 24 realized on the front end of the plug part 10 by a spring 25 that forms part of the valve body 11 and is supported on a spring abutment 26.

Consequently, the inner channel 13 is sealed relative to the outside by the closing cone 18 and the outer channel 16 is sealed relative to the outside by the closing sleeve 23.

In the embodiment shown, a check valve 27 in the connector 12, which is prestressed by means of a supporting spring 28, protrudes into the connecting bore 15 such that the inner channel 13 of the valve body 11 is sealed relative to the fluid present in the connector 12, as well as in the hose or pipeline attached thereto, in the closed position of the check valve 27 illustrated in FIG. 1.

With respect to the coupling of the plug part 10 to the receptacle part yet to be described, a helical groove 29, the function and effect of which are described in greater detail below, is arranged on the outer circumference of the plug part 10.

Figure 2:
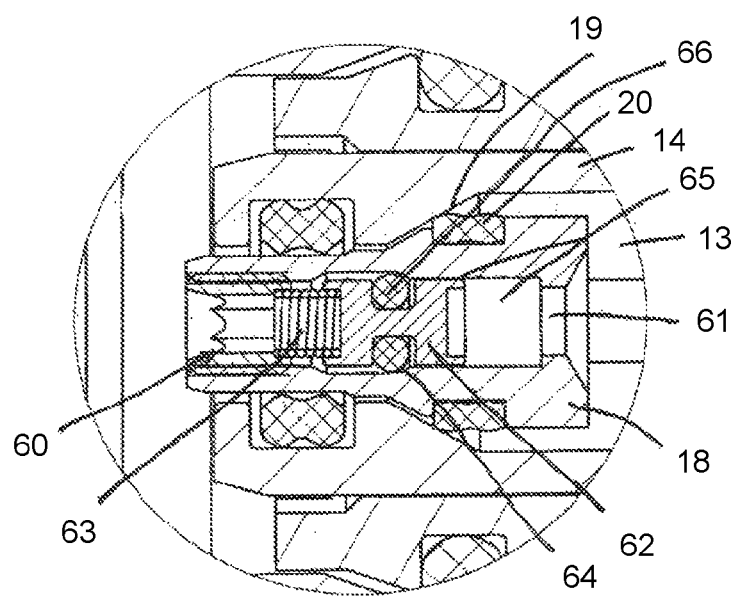
FIG. 2 shows the auxiliary valve according to the detail "X" in FIG. 1, which is arranged in the closing cone of the plug part, in the form of an enlarged partial view.

In case the fluid volume enclosed in the inner channel 13 of the plug part 10 between the front closing cone 18 and the rear check valve 27 heats up in the decoupled state according to FIG. 1, for example due to heat exposure, and a corresponding pressure increase occurs, an auxiliary valve 60 for relieving the pressure is arranged in the closing cone 18 as illustrated in greater detail in FIG. 2. This auxiliary valve 60 consists of a valve bore 61 that extends through the closing cone 18 and is connected to the inner channel 13 with a conical widening on one side and has an outlet into the atmosphere on the opposite side. A valve piston 62 is arranged in the valve bore 61 such that it can be displaced against the force of a spring 63 and carries a seal 66 on its outer circumference. In order to realize a leakage path, the valve bore 61 is provided with a cross-sectional widening 64 that is spaced apart from the connection of the valve bore 61 to the inner channel by a clearance 65 and designed in such a way that the valve piston 62 is no longer sealed relative to the wall of the valve bore 61 or its cross-sectional widening 64 when the seal 66 of the valve piston 62 enters the cross-sectional widening 64 and fluid can flow from the inner channel 13 through the valve bore 61 and past the outside of the valve piston 62 with its seal 66 in order to ultimately escape into the atmosphere. In this context, FIG. 2 shows the leakage position of the valve piston 62 in the valve bore 61. In the closed state of the auxiliary valve 60, the spring 63 ensures that the valve piston 61 with its seal 66 is situated within the predefined clearance 65, in which the seal 66 correspondingly seals the valve bore 61.

Figure 3:
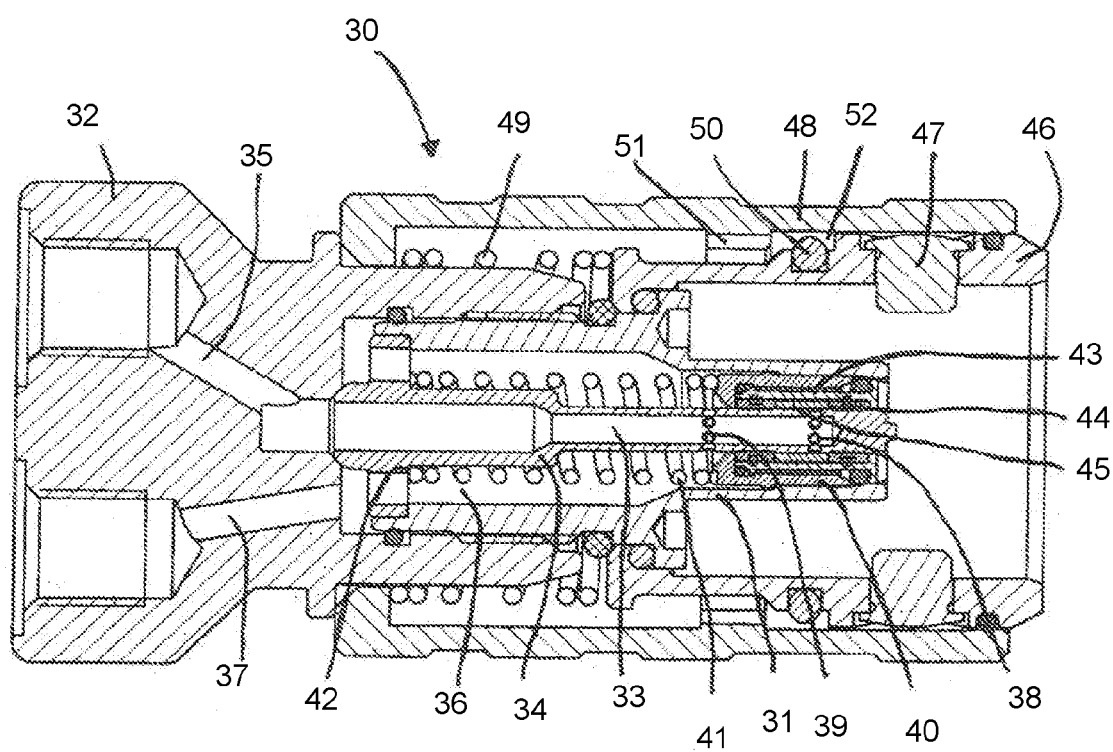
FIG. 3 shows an individual illustration of the corresponding receptacle part of the high-pressure coupling in the form of a sectioned side view.

FIG. 3 shows the corresponding receptacle part 30 for the plug part 10 of the inventive high-pressure coupling that was described above with reference to FIGS. 1 and 2. The receptacle part 30 once again consists of a valve body 31 and a connector 32 connected thereto. An inner channel 33 is formed in the receptacle part 30 by a correspondingly arranged inner pipe 34 and once again connected to a connecting bore 35 in the connector 32. Analogous to the design of the plug part, an outer channel 36 that concentrically surrounds the inner pipe is also provided in the receptacle part 30 and connected to a connecting bore 37 in the connector 32.

In order to realize a corresponding flow path, the inner pipe 34 is provided with two radially circumferential rows of bores that are spaced apart from one another by an axial clearance, namely with front bores 38 on its end that faces the open end of the receptacle part 30 and therefore the plug part 10 to be inserted into the receptacle part 30 and with rear bores 39 that are spaced apart from the front bores by the axial clearance.

In order to close the outer channel 36 of the receptacle part 30, a sleeve-shaped closing body 40 is furthermore guided on the inner pipe 34 of the receptacle part and prestressed into a front closing position, in which the sleeve-shaped closing body 40 covers and therefore seals the front bores 38 of the inner pipe 34, by a spring 41 that is supported on a spring abutment 42. For this purpose, the sleeve-shaped closing body 40 features in its interior a holding part 43 for fixing two sliding rings 44 that are respectively arranged on the two ends of the closing body 40 and a spacer ring 45 lying in between. According to the closed position of the receptacle part 30 illustrated in FIG. 3, the front bores 38 of the inner pipe 34 are covered by the spacer ring 45 of the sleeve-shaped closing body 40. The corresponding seal of the front bores 38 is realized by sealing the two outer sliding rings 44, which enclose the spacer ring 45 between one another, relative to the holding part 43 that holds these sliding rings and forms part of the closing body 40 with the aid of corresponding soft seals such that no fluid can escape from the inner pipe 34 toward the front. The rear bores 39 of the inner pipe 34, in contrast, are not covered by the sleeve-shaped closing body 40 such that a connection between the inner channel 33 and the outer channel 36 of the receptacle part 30 is produced via the rear bores 39 in order to realize a pressure compensation of the type also described in aforementioned publication EP 1 789 717 B1.

Furthermore, a forwardly protruding locking sleeve 46 designed for accommodating the plug part 30 is arranged on the valve body 31 of the receptacle part 30 and carries driving projections 47 on its inner side. These driving projections 47 are designed for engaging into the helical grooves 29 of the plug part 10 inserted into the receptacle part 30 or its locking sleeve 46, respectively, such that a rotation of the locking sleeve 46 causes the driving projections 47 to slide in the helical grooves 29 of the plug part 10 and to thereby axially pull the plug part into the receptacle part 30, as well as to fix the plug part 10 and the receptacle part 30 relative to one another in the coupled state. A design of this type is described in aforementioned publication WO 2008/130311 A1.

In order to increase the manipulation safety, an additional actuating sleeve 48 is displaceably arranged on the valve body 31 of the receptacle part 30 or on the locking sleeve 46 arranged thereon, respectively, and prestressed into its rear position by a correspondingly supported spring 49. Furthermore, locking balls 50 are inserted into radial bores distributed over the circumference of the locking sleeve 46 such that they protrude over the circumference of the locking sleeve 46 with part of their cross section. In the rear idle position of the actuating sleeve 48 assumed due to the force of the spring 49, correspondingly arranged recesses 52 in the actuating sleeve 48 are positioned above the locking balls 50 such that the actuating sleeve 48 is freely rotatable relative to the locking sleeve 46 in this idle position and the locking sleeve 46 is not set in rotation by rotating the actuating sleeve 48. Ball receptacles 51 are furthermore provided on the inner side of the actuating sleeve 48 with an axial offset referred to the recesses 52. When the actuating sleeve 48 is forwardly displaced away from the connector 32 against the force of the spring 49, the ball receptacles 51 of the actuating sleeve 48 are moved above the locking balls 50 of the locking sleeve 46 such that an interlock means in the form of a positive fit between the actuating sleeve 48 and the locking sleeve 46 is realized in this forwardly displaced position of the actuating sleeve 48. If the actuating sleeve 48 is rotated in this displaced position, the actuating sleeve 48 also drives the locking sleeve 46 during its rotation such that the coupling process or also a decoupling process is effectively initiated due to the engagement of the driving projections 47 into the helical grooves 49. Once the coupling or decoupling process has been completed and the actuating sleeve 48 has been released, the spring 49 pushes the actuating sleeve back into its rear position facing the connector 32, in which the actuating sleeve 48 is once again freely rotatable relative to the locking sleeve 46 and the high-pressure coupling cannot be inadvertently coupled or decoupled.

With respect to the preceding description of the plug part 10, the receptacle part 30 and the auxiliary valve 60 with their corresponding individual components, it goes without saying that these individual components respectively need to be suitably sealed with the aid of separate seals, wherein the position of these seals is not discussed in greater detail if they are not directly related to the invention.

Figure 4:
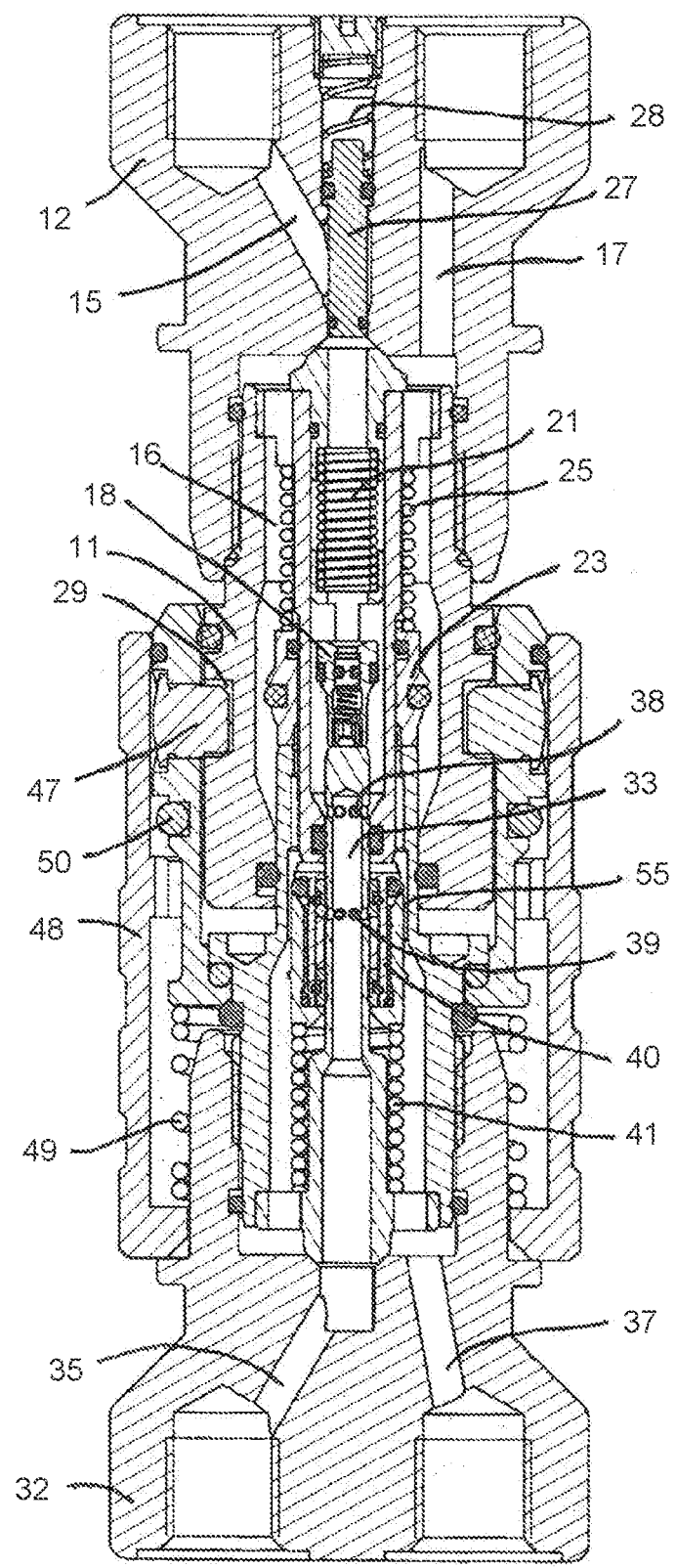
FIG. 4 shows the high-pressure coupling with the plug part (FIG. 1) and the receptacle part (FIG. 3) in the coupled state, namely in the form of an illustration according to FIGS. 1 and 3.

In the coupled state of the plug part 10 and the receptacle part 30 illustrated in FIG. 4, the valve body 11 of the plug part 10 is inserted into the receptacle part 30, wherein the driving projections 47 of the locking sleeve 46 of the receptacle part 30 lie in the helical grooves 29 of the plug part 10 and therefore fix the plug part 10 relative to the receptacle part 30. Due to the force of the spring 49, the actuating sleeve 48 is in this case situated in its rear position, in which it is freely rotatable relative to the locking sleeve 46, such that unintentional decoupling is precluded. In this case, the inner pipe 34 of the receptacle part 30 has displaced the closing cone 18 into the inner pipe 14 of the plug part 10 against the force of the spring 21 acting upon the closing cone such that the fluid arriving through the inner pipe 34 of the receptacle part 30 can flow into the inner channel 13 of the plug part 10 through the front bores 38. Once the corresponding pressure is reached, the check valve 27 in the connecting bore 15 of the connector 12 subsequently opens such that the fluid can flow onward into the hose or pipeline attached to the connector 12. At the same time, the front end of the inner pipe 14 of the plug part 10 has displaced the sleeve-shaped closing body 40 on the inner pipe 34 of the receptacle part 30 rearward against the force of the spring 41 prestressing the sleeve-shaped closing body such that the holding part 43 and the sliding ring 44 of the sleeve-shaped closing body 40 have opened the front bores 38 of the inner pipe 40 of the receptacle part 30 in order to realize the above-described flow path, but the rear bores 39 of the inner pipe 34 of the receptacle part 30 are already closed, such that the bypass realized at this location in the decoupled state is now blocked. The outer channel 16 of the plug part 10 and the outer channel 36 of the receptacle part 30 are at the same time connected to one another via an outer flow channel 55.

Figure 5:
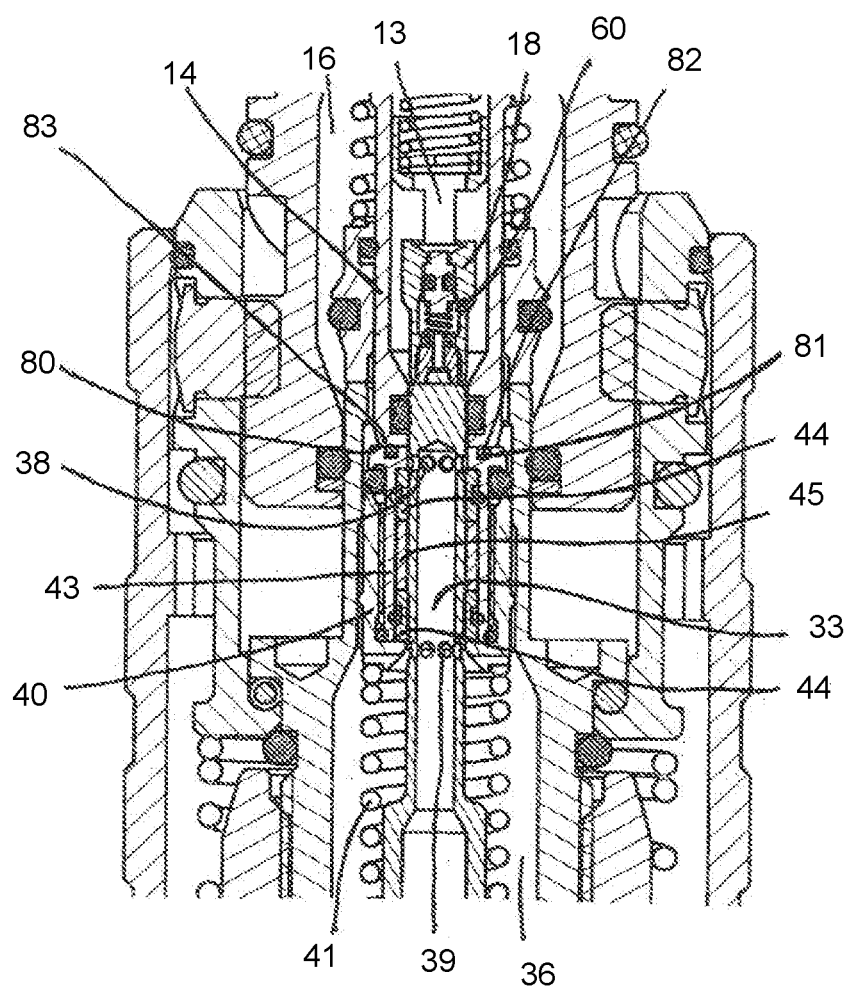
FIG. 5 shows the high-pressure coupling with the plug part and the receptacle part during the coupling process, in which the inner channel of the receptacle part is sealed relative to the outer channel of the plug part, namely in the form of an enlarged illustration of the connecting region between the inner channels of the receptacle part and the plug part, as well as the outer channels of the receptacle part and the plug part.

FIG. 5 shows an intermediate position of the receptacle part 30 and the plug part 10 during the coupling process, in which the inner channel 33 of the receptacle part 30 also remains sealed relative to the outer channel 16 of the plug part 10 during this coupling process. For this purpose, a groove 81 with a seal 82 inserted therein is respectively arranged in the end face 80 of the closing body 40 or the holding part 43 held therein such that the two end faces 80 and 83 are sealed relative to one another once the end face 83 of the inner pipe 14 of the plug part comes in contact with the end face 80 of the closing body 40 during the coupling process. Consequently, the fluid already discharged from the front bores 38 of the inner pipe 34 of the receptacle part 30 during the coupling process cannot be admitted into the outer channel 16 of the plug part 10.

Although not illustrated in detail, corresponding processing of either the end face 80 of the closing body 40 or the end face 83 of the inner pipe 14 may in an alternative embodiment of the invention ensure that a metallic seal is produced between the end faces 80, 83 when they contact one another during the coupling process.

In an alternative embodiment of the invention, the proposed design illustrated in FIGS. 1 and 3 may in accordance with EP 1 789 717 B1 be realized such that the inner channel 33 of the receptacle part 30 is for a brief moment connected to the outer channel 16 of the plug part 10 during the coupling process, namely while the inner pipe 34 of the valve body 31 of the receptacle part 30 is inserted into the valve body 11 of the plug part 10 on the one hand and while the sleeve-shaped closing body 40 is pushed back by the front end face 83 of the inner pipe 14 of the plug part 10 in order to open the front bores 38 of the inner pipe 34 on the other hand. In this intermediate position, the clearance between the front bores 38 and the rear bores ensures that the bypass connection between the inner channel 33 and the outer channel 36 of the receptacle part 30 realized by means of the rear bores 39 is interrupted due to the predefined position of the sleeve-shaped closing body 40 in the instant, in which the inner channel 33 of the receptacle part 30 is connected to the outer channel 16 of the plug part 10 due to the contacting end faces 80 of the closing body 40 and 83 of the inner pipe 14.

In order to decouple the coupling position illustrated in FIG. 4, the actuating sleeve 48 is displaced into the front position, in which the ball receptacles 51 of the actuating sleeve 48 interlock with the locking balls 50 of the locking sleeve 46 in order to realize the interlock means, against the force of the spring 49 such that a backward rotation of the actuating sleeve 48 also leads to a corresponding rotation of the locking sleeve 46 and the release of the plug part 10 from the receptacle part 30.

Figure 6:
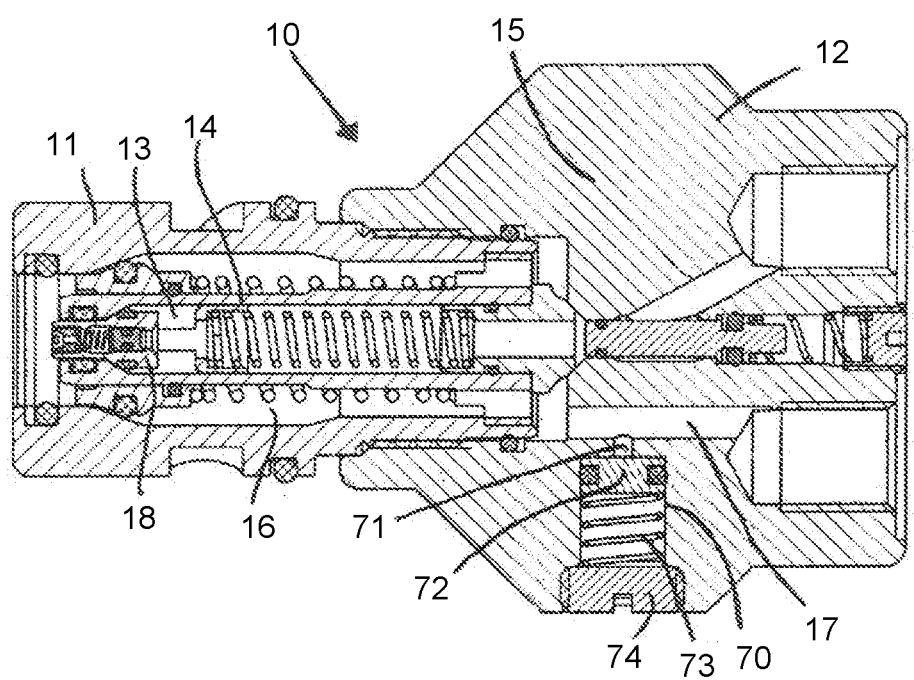
FIG. 6 shows a modified embodiment of the plug part according to FIG. 1 that is provided with an additional overpressure relief for the outer channel.

According to FIG. 6, the plug part 10 described in detail above with reference to FIGS. 1 to 4 may also be provided with an additional overpressure relief for the fluid volume present in its outer channel 16 and the connecting bore 17 connected thereto in the decoupled state of the high-pressure coupling. For this purpose, a hollow space 70, which is connected to the connecting bore 17 by means of a connecting bore 71, is provided in the receptacle part 12 and sealed in a fluid-tight fashion on its outer side by means of a drain plug 74. A piston 72 provided with a circumferential outer seal is displaceably arranged in the hollow space 70 and prestressed into a position, in which it closes the connecting bore 71 leading to the connecting bore 17, by means of a spring 73 that is supported on the drain plug 74. If a pressure increase occurs in the outer channel 16 or in the connecting bore 17 when the high-pressure coupling is decoupled, the fluid volume present presses the piston 72 into the hollow space 70 against the force of the spring 73, namely into a position, in which the hollow space 70 is accordingly unblocked and in which the unblocked hollow space 80 provides an additional volume, by means of which a corresponding pressure increase is prevented.

The characteristics of the object of this document disclosed in the preceding description, the claims, the abstract and the drawings may be essential to realizing the different embodiments of the invention individually, as well as in arbitrary combinations.

The invention claimed is:

1. A coaxial high-pressure coupling for hoses or pipelines with a plug part and with a receptacle part that accommodates the plug part in a coupled state, wherein the plug part and the receptacle part each have a valve body with an inner channel and an outer channel arranged concentric thereto, wherein the inner channels and the outer channels of the plug part and of the receptacle part are connected to one another in the coupled state, wherein a closing cone is movable in the inner channel of the valve body of the plug part and a closing sleeve is movable in the outer channel of the plug part against a respective force of a spring, and wherein the closing cone and the closing sleeve are respectively displaceable into their open position by the receptacle part during a coupling process, wherein a valve bore, which is connected to the inner channel at one end and connected to atmosphere at the other end, has a valve piston displaceably arranged therein, the valve piston being arranged in the interior of the closing cone that can be moved in the inner channel formed by an inner pipe, and wherein the valve piston is prestressed into a blocking position, in which the valve piston blocks the connection between the valve bore and the inner channel, by a force of a spring and can be displaced into a leakage position by an overpressure in the inner channel that acts against the spring.

2. The coaxial high-pressure coupling according to claim 1, wherein the valve bore is provided with an incremental cross-sectional widening in order to realize an effective leakage path between the inner channel and the atmosphere in the leakage position of the valve piston.

3. The coaxial high-pressure coupling according to claim 2, wherein the cross-sectional widening is spaced apart from the valve piston situated in its blocking position by a clearance that needs to be traveled by the valve piston when it is acted upon with an overpressure.

4. The coaxial high-pressure coupling according to claim 1, wherein a check valve is inserted between the closing cone arranged in the inner channel of the valve body of the plug part and a continuing line attached to the plug part.

5. The coaxial high-pressure coupling according to claim 1, wherein a hollow space, which is connected to the outer channel or to the connecting bore assigned thereto, is provided in the plug part in order to prevent a pressure increase in the outer channel in the valve body or in the receptacle part, wherein a piston is movably arranged in said hollow space and prestressed into a position, in which the piston blocks the hollow space, by means of a spring, and wherein said piston can be displaced into the hollow space into a position, in which the piston unblocks the hollow space so as to realize a pressure compensation, due to an increasing pressure in the outer channel or in the connecting bore.

6. The coaxial high-pressure coupling according to ti claim 1, in which the valve body of the receptacle part has an additional bypass valve that produces a connection between the inner channel and the outer channel of the receptacle part in a decoupled state and closes the connection in the coupled state, wherein an inner pipe forming the inner channel of the receptacle part has two bores that are arranged at an axial clearance from one another, and in that a sleeve-shaped closing body, which can be displaced on the inner pipe in the outer channel surrounding the inner pipe, on the one hand closes a front bore of the inner pipe that faces the plug part and opens a rear bore as a bypass between the inner channel and the outer channel of the receptacle part in a closing position, in which the sleeve-shaped closing body is situated in the decoupled state, and on the other hand closes the rear bore of the inner pipe and opens the front bore in a position, in which the sleeve-shaped closing body is displaced into the interior of the valve body of the receptacle part due to a contact between an end face of the inner pipe of the plug part facing the receptacle part and the end face of the closing body of the receptacle part during a coupling process, such that the inner channel of the receptacle part is connected to the inner channel of the plug part via the front bore in the coupled state.

7. The coaxial high-pressure coupling according to claim 6, wherein end faces of the closing body and of the inner pipe are sealed relative to one another while the front bore of the inner pipe of the receptacle part is opened due to the displacement of the closing body by the inner pipe of the plug part that contacts its end face in order to continuously seal the inner channel of the receptacle part relative to the outer channel of the plug part.

8. The coaxial high-pressure coupling according to claim 7, wherein a groove with a seal inserted therein is arranged in one of the end faces in order to seal the end faces relative to one another.

9. The coaxial high-pressure coupling according to claim 7, wherein at least one end face is processed such that a metallic seal is realized when the end faces contact one another in order to seal the end faces relative to one another.

10. The coaxial high-pressure coupling according to claim 6, wherein end faces of the closing body and of the inner pipe allow a fluid passage while the front bore of the inner pipe of the receptacle part is opened during the coupling process due to the displacement of the closing body by the inner pipe that contacts its end face and the inner channel of the receptacle part is connected to the outer channel of the plug part in an intermediate stage during the coupling process.

11. The coaxial high-pressure coupling according to claim 6, wherein a sliding ring of a material with sound sliding properties, which is respectively positioned on outer ends of the sleeve-shaped closing body, as well as a spacer ring lying in between, are arranged in the interior of the sleeve-shaped closing body that can be displaced on the inner pipe, wherein the spacer ring covers a front bore of the inner pipe in the closing position of the closing body in the decoupled state and the two sliding rings are sealed relative to the closing body by means of ring seals arranged on their circumference.

12. The coaxial high-pressure coupling according to claim 1, in which a rotatable outer actuating sleeve and an inner locking sleeve that cooperates with the actuating sleeve and has driving projections that engage into helical grooves of the plug part are arranged on the receptacle part, wherein the outer actuating sleeve can be displaced relative to the locking sleeve between a decoupled idle position, in which the outer actuating sleeve is freely rotatable relative to the locking sleeve, and an engaged position with the locking sleeve, wherein the actuating sleeve is interlocked with the locking sleeve with the aid of an interlock means in the engaged position such that the locking sleeve is only rotationally driven due to a rotation of the actuating sleeve in the engaged position.

* * * * *